(12) United States Patent
Viermann et al.

(10) Patent No.: US 10,376,075 B2
(45) Date of Patent: Aug. 13, 2019

(54) ELECTROMOTIVE FURNITURE DRIVE, FURNITURE AND METHODS FOR CONTROLLING AN ELECTROMOTIVE FURNITURE DRIVE

(71) Applicant: DEWERTOKIN GMBH, Kirchlengern (DE)

(72) Inventors: Thomas Viermann, Löhne (DE); Werner Kracht, Hüllhorst (DE); Alexander Tews, Bielefeld (DE)

(73) Assignee: DewertOkin GmbH, Kirchlengern (DE)

( * ) Notice: Subject to any disclaimer, the term of this patent is extended or adjusted under 35 U.S.C. 154(b) by 0 days.

(21) Appl. No.: 15/776,327

(22) PCT Filed: Nov. 11, 2016

(86) PCT No.: PCT/EP2016/077490
§ 371 (c)(1),
(2) Date: May 15, 2018

(87) PCT Pub. No.: WO2017/084984
PCT Pub. Date: May 26, 2017

(65) Prior Publication Data
US 2018/0325269 A1  Nov. 15, 2018

(30) Foreign Application Priority Data

Nov. 16, 2015 (DE) .................... 20 2015 106 208 U

(51) Int. Cl.
A47C 20/04 (2006.01)
A47C 20/08 (2006.01)
(Continued)

(52) U.S. Cl.
CPC .......... *A47C 20/041* (2013.01); *A47C 31/008* (2013.01); *A47C 20/08* (2013.01); *G08C 19/00* (2013.01); *H04W 4/00* (2013.01)

(58) Field of Classification Search
CPC . A61N 1/08; A61G 7/00; G05B 11/01; G05B 15/02; G08C 17/02; G08C 19/00;
(Continued)

(56) References Cited

U.S. PATENT DOCUMENTS 5,455,490 A * 10/1995 Callahan ................. F21V 23/04
315/194
5,771,511 A * 6/1998 Kummer ................ A61G 7/015
5/600
(Continued)

FOREIGN PATENT DOCUMENTS

WO    WO 2006/039929 A2    4/2006

OTHER PUBLICATIONS

International Search Report issued by the European Patent Office in International Application PCT/EP2016/077490.

*Primary Examiner* — Nam V Nguyen
(74) *Attorney, Agent, or Firm* — Henry M. Feiereisen LLC

(57) ABSTRACT

An electromotive furniture drive includes an adjusting drive for electromotive movement of a movable furniture component relative to another furniture component, a remote control, a communication unit which is configured to receive a wireless signal from the remote control and to determine a signal strength of the wireless signal, and a control device which is configured to control operation of the adjusting drive in response to the wireless signal only when the signal strength of the wireless signal exceeds a predetermined threshold value.

22 Claims, 2 Drawing Sheets

(51) Int. Cl.
*A47C 31/00* (2006.01)
*G05B 11/01* (2006.01)
*H04W 4/00* (2018.01)
*G08C 19/00* (2006.01)

(58) Field of Classification Search
CPC ...... G08B 25/008; G01M 1/38; H04W 4/008; H04W 4/00
USPC ......... 340/12.22, 12.28, 4.11, 12.5; 600/300; 5/600, 618, 617, 624, 424; 455/41.3
See application file for complete search history.

(56) References Cited

U.S. PATENT DOCUMENTS

| | | | | |
|---|---|---|---|---|
| 6,106,576 A * | 8/2000 | Fromson | ............... | A61H 1/00 318/16 |
| 7,669,261 B2 * | 3/2010 | Fruh | ............... | A61G 13/02 5/613 |
| 7,768,420 B2 * | 8/2010 | Neogi | ............... | G08C 23/04 340/10.2 |
| 8,125,318 B2 * | 2/2012 | Heimbrock | ............... | A61B 6/0457 340/12.22 |
| 8,634,981 B1 * | 1/2014 | Hyde | ............... | A61G 1/0275 180/19.1 |
| 8,909,378 B2 * | 12/2014 | Rawls-Meehan | ............... | A47C 20/041 5/616 |
| 9,149,126 B2 * | 10/2015 | Rawls-Meehan | ............... | A47C 21/006 |
| 9,351,353 B2 * | 5/2016 | Recker | ............... | H02J 9/02 |
| 9,412,262 B2 * | 8/2016 | Baker | ............... | G08C 17/02 |
| 9,514,637 B2 * | 12/2016 | Baker | ............... | G08C 17/02 |
| 9,836,034 B2 * | 12/2017 | Hille | ............... | A47C 20/041 |
| 2008/0262657 A1 * | 10/2008 | Howell | ............... | A47C 20/041 700/275 |
| 2012/0112891 A1 * | 5/2012 | Rawls-Meehan | ............... | A47C 20/041 340/12.5 |
| 2014/0302795 A1 * | 10/2014 | Chacon | ............... | G08C 17/02 455/41.3 |
| 2015/0019020 A1 | 1/2015 | Hille et al. | | |
| 2015/0082542 A1 | 3/2015 | Hayes et al. | | |
| 2015/0181662 A1 * | 6/2015 | Ghoshal | ............... | G01J 1/4204 315/149 |
| 2015/0189425 A1 | 7/2015 | Pang | | |

* cited by examiner

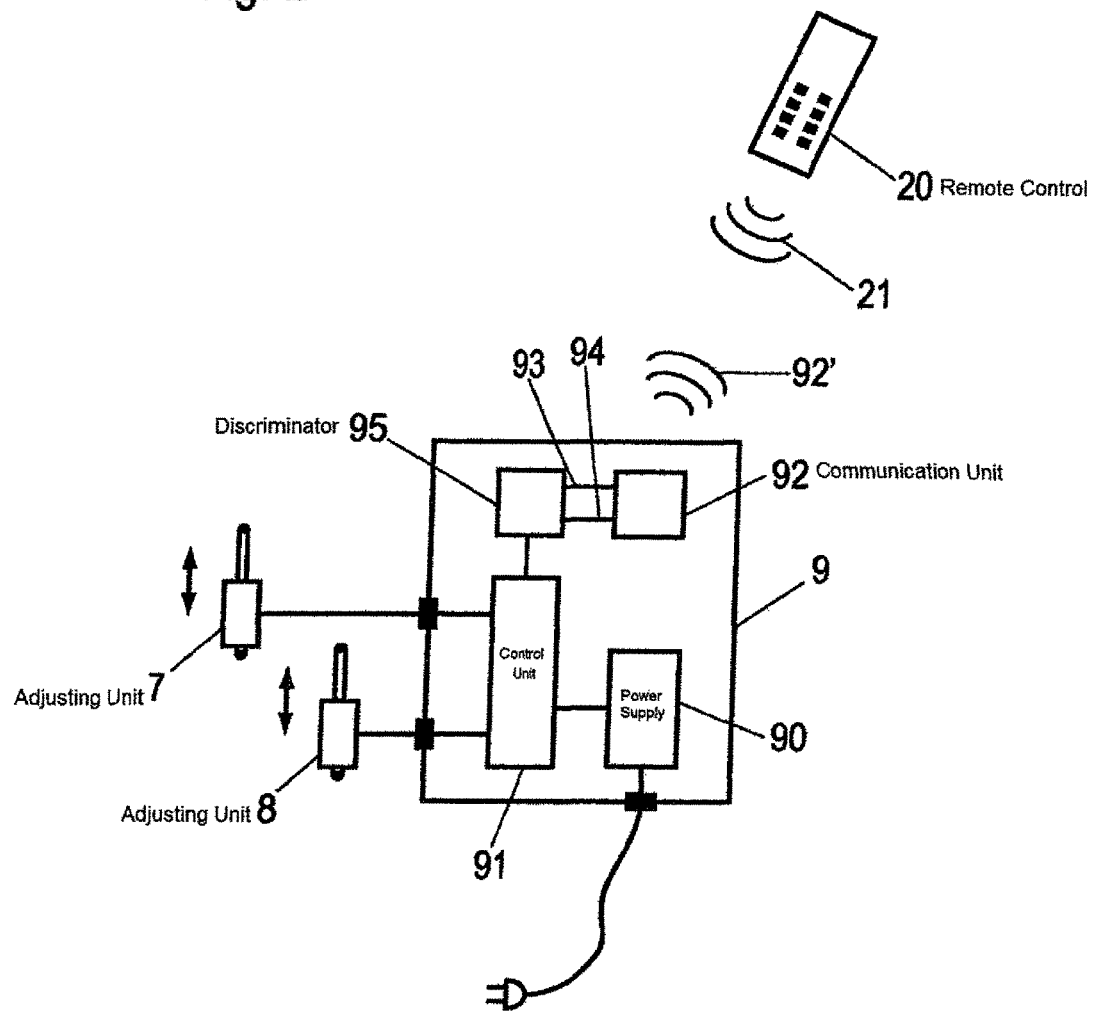

ELECTROMOTIVE FURNITURE DRIVE, FURNITURE AND METHODS FOR CONTROLLING AN ELECTROMOTIVE FURNITURE DRIVE

CROSS-REFERENCES TO RELATED APPLICATIONS

This application is the U.S. National Stage of International Application No. PCT/EP2016/077490, filed Nov. 11, 2016, which designated the United States and has been published as International Publication No. WO 2017/084984 and which claims the priority of German Patent Application, Serial No. 20 2015 106 208.7, filed Nov. 16, 2015, pursuant to 35 U.S.C. 119(a)-(d).

BACKGROUND OF THE INVENTION

The invention relates to an electromotive furniture drive having a number of adjusting drives for electromotive movement of at least one movable furniture component relative to another furniture component, a control device and a communication unit coupled to the control device for receiving wireless signals of a remote control, wherein the adjusting drives are actuated in response to received wireless signals. The invention further relates to methods for controlling an electromotive furniture drive and a piece of furniture with an electromotive furniture drive.

To control the adjusting drives of electromotive furniture drives, handsets are common, which are coupled, for example, to the control device via a cable. Such handsets are reliable, but inflexible to use due to the cable. For electromotive furniture drives, wireless handsets, which are more flexible and convenient to use, are alternatively used more widely. A combination of both operating options is described in document WO 2006/039929 A2. In this case, a communication unit is arranged on a cable-bound handset, which receives wireless signals from a remote control and transmits them to the control device. The wireless transmission takes place via infrared light in this case.

In the meantime, furniture drives are also known in which radio transmission is used instead of an infrared transmission. This offers the advantage, for example, that mobile devices such as smartphones, by using a dedicated program ("app"), can be used as a remote control, as these are usually equipped with suitable wireless transmission equipment (communication units), for example, in order to enable performing communication according to the Bluetooth or WLAN standard.

Whereas in the infrared transmission according to the document WO 2006/039929 A2 a control of the adjusting drives is only possible in the field of view, in radio-based transmissions an (unwanted) operation can occur, however, even outside the field of view, e.g. from a neighboring room. This can lead in the worst case to an impairment or even injury to a person who uses the electromotively adjustable furniture.

SUMMARY OF THE INVENTION

The invention is therefore based on the object of providing a remote control option for electromotive furniture drives, in which the risk of such unwanted operation is prevented.

This object is achieved by an electromotive furniture drive, a furniture item and a method for controlling an electromotive furniture drive with the features of the respective independent claim. Advantageous embodiments are the subject matter of the dependent claims.

An electromotive furniture drive according to the invention is characterized in that the communication unit is adapted to determine a signal strength of the received wireless signal (radio signal), and that the control device is adapted to control the adjusting drives only when the signal strength exceeds in magnitude a predetermined threshold value.

A first method according to the invention comprises the following steps: Wireless signals are sent from the remote control to the communication unit and are received by the communication unit. Control signals from the received wireless signals are then determined on the one hand and a signal strength of the received wireless signals is determined on the other hand. The determined signal strength is compared with a predetermined threshold value, whereupon at least one adjusting drive then and only then is actuated according to the control signals when the signal strength exceeds in magnitude the predetermined threshold value. If, on the other hand, the signal strength does not exceed in magnitude the predetermined threshold value, the control signals are ignored.

If the radio transmission path between the remote control and the communication unit is designed as bidirectional transmission path, a second method according to the invention can alternatively be carried out with the following steps: Wireless signals are sent from the communication unit to the remote control, for example in the course of protocol negotiations or acknowledgments of receipt. The wireless signals are received by the remote control and a signal strength of the received wireless signals is determined. The signal strength is compared to a predetermined threshold value. Only when the signal strength exceeds in magnitude the predetermined threshold value, wireless signals are sent this time from the remote control to the communication unit to control at least one adjusting drive.

In the method according to the invention or in the furniture drive according to the invention it is prevented, by taking into account the received signal strength, that a remote control that is too far away and thus, for example, is no longer in sight can be used to operate the adjusting drives. The person using the furniture is thus protected from any subsequent serious misoperations of the furniture drive.

In an advantageous embodiment of the method, the threshold value is determined from the magnitude of the signal strength of a wireless signal previously received during a learning phase. In this way, the drive can be adapted to the spatial conditions, so that an operation from within the room is possible, but an operation occurring through a wall is prevented due to the lower signal strength.

Alternatively, it is provided to adjust the threshold value manually to the spatial conditions. The adjustment is provided by means of the remote control or by means of an optional additional handset. For this purpose, the remote control or handset are set to a threshold-value adjustment mode and subsequently the setting of the threshold value occurs by manual input via buttons, switches, a keyboard, a touch-sensitive input field or by entering a numerical value.

It is provided in an advantageous embodiment of the furniture drive that the communication unit outputs a control signal that reflects the content of the received wireless signals, and outputs a reception strength signal that represents the signal strength of the received wireless signal.

Alternatively, the detected signal strength can be mapped as numerical value or as a distance value in meters for example, wherein the numerical value or the distance value corresponds to the magnitude of the signal. The numerical value of the signal strength can then be used for further evaluation and comparison with the threshold value.

The control device preferably has a discriminator, which is connected to the communication unit and which transmits the control signal only when the reception strength signal exceeds in magnitude the predetermined threshold value. The communication unit and/or the discriminator can be integrated into the control device.

In a further advantageous embodiment of the furniture drive, the control device is connected to a handset, via which the adjusting drives can be controlled by cable. In this case, the communication unit and/or the discriminator can be integrated in the handset, whereby easy retrofitting of control devices is possible which are not initially equipped for remote operation.

In an alternative embodiment, the electromotive furniture drive is provided with a communication unit and/or a discriminator, wherein the communication unit and/or the discriminator is attached anywhere on the electromotive furniture drive or integrated in a component of the electromotive furniture drive or is assigned to a component of the electromotive furniture drive. Advantageously, this provides very high flexibility of the entire system of the electromotive furniture drive. For example, it is thus possible to integrate the communication unit and/or the discriminator in a connecting cable, in an adjusting drive, in a mains-dependent power supply, in a control device, in an adjusting drive or in another component, or to attach it thereto.

In a further advantageous embodiment, the handset has a manually operable lock switch which suppresses at least the forwarding of the wirelessly received control signals of the remote control. Alternatively, the lock switch switches the power supply of the communication unit.

The remote control is designed in a preferred form as a smartphone. Alternatively, a portable (hand-held) device with a control panel and a wireless transmission path is provided as a remote control especially designed for this application.

The remote control and the communication unit are preferably designed for the transmission of data or data packets according to the Bluetooth standard. Alternatively or optionally or additionally, a transmission according to the WLAN, DECT or ZigBee format may be provided.

The wireless signal can be transmitted via a unidirectional or via a bidirectional radio link. The transmission path can be formed in the simplest case as a proprietary transmission path. However, the aforementioned bidirectional transmission links are also usable. If the radio transmission path is formed as a unidirectional transmission path, the mapping of the signal strength or the mapping of the numerical value corresponding to the signal strength is carried out on the furniture side by a component of the electromotive furniture drive connected to the furniture.

The invention further relates to a piece of furniture with a movable furniture part having such an electromotive furniture drive.

The invention will be explained below with reference to embodiments by means of the drawings, wherein:

BRIEF DESCRIPTION OF THE DRAWING

FIG. 2 shows a schematic representation of an electromotive furniture drive with adjustable drives and a wireless remote control.

DETAILED DESCRIPTION OF PREFERRED EMBODIMENTS

Figure 1:
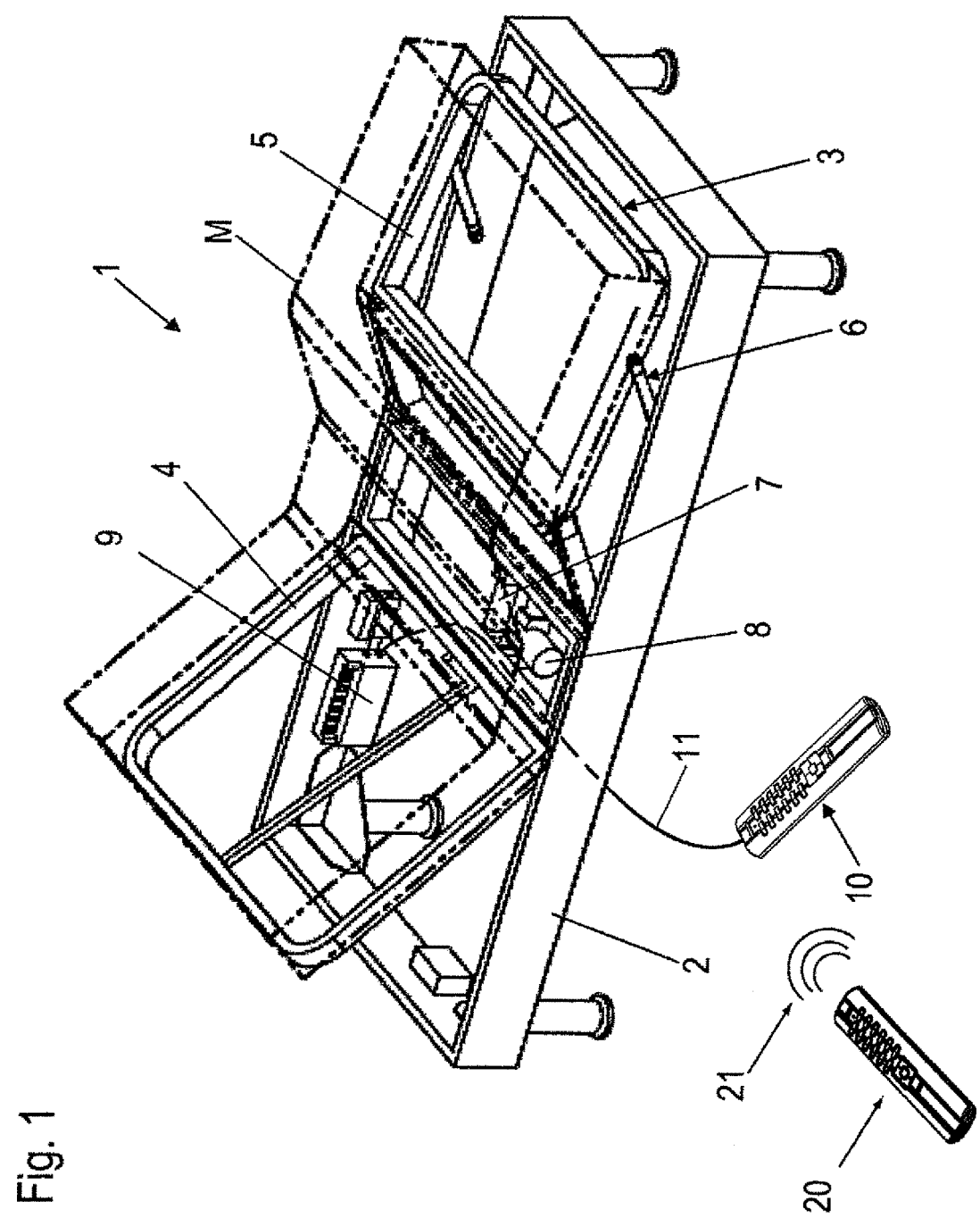
FIG. 1 shows a schematic perspective view of an exemplary furniture arrangement.

FIG. 1 shows a furniture assembly with a furniture item 1. A bed is exemplified here as a furniture item 1. The furniture item 1 has at least one support element 3 for receiving objects, a padding, a mattress M and/or a person. The support element 3 is formed for example as a slatted frame, as a flat support surface or the like and formed on a base element 2, here a frame with feet, with which the furniture item 1 is set up at an installation location, e.g. a floor.

In the example shown, the support element 3 has a back part 4 and a leg part 5, which are arranged movably relative to a further support element or relative to the base element 2. This movable arrangement is realized here by means of a so-called motion fitting 6. The movement is designed to be displaceable and/or pivotable.

The movably mounted back part 4 and the leg part 5 are each coupled to an electromotive adjusting drive 7, 8. Thus, the back part 4 is coupled to the electromotive adjusting drive 7. The electromotive adjusting drive 8 is provided to move or adjust the leg part 5.

The electromotive adjusting drives 7, 8 are presently designed as linear drives. The linear drives have one or a number of electromotors, wherein each engine is connected downstream with a speed reduction gear with at least one gear stage. The speed reduction gear may be provided downstream with another gear, for example in the form of a threaded spindle drive, which generates a linear movement of an output member from the rotational movement of the motor. The last gear member or an associated further member forms the output member. The output member of the respective electromotive adjusting drive is connected to the respective furniture component (back part 4, leg part 5) or alternatively to a component connected to the base element 2, so that during operation of the electric motor of the respective adjusting drive 7, 8, the movable furniture components 4, 5 are adjusted relative to each other or relative to the base element 2.

The electromotive adjusting drives 7, 8 are connected to a control device 9, also called engine control. This connection can be designed, for example, as a pluggable cable connection, which is not shown here in closer detail. The control device 9 has an electrical supply unit which provides the electrical energy, e.g. from the network, for the electromotive adjusting drives 7, 8. For this purpose, the control device 9 is connected via a power cord, not shown in this example, to a mains plug with a mains connection. The mains plug passes the input side mains voltage via the power cord to the electrical supply unit of the control device 9, which outputs a low voltage in the form of a DC voltage on the secondary side and forwards said voltage to a control device.

Alternatively, the control device 9 is preceded by a network-dependent power supply (not shown in detail) with mains input and secondary-side low-voltage output, which supplies the low voltage in the form of a DC voltage via the line.

With the control device 9, a handset 10 is connected via a cable 11 which is fixedly mounted in this exemplary embodiment at least on the handset 10.

The handset 10 has operating elements, by means of which the electromechanical adjusting drives 7, 8 can be controlled via the control device 9.

The operating elements can be configured for example as a button and/or switch. Furthermore, the handset 10 can be equipped with an indicator element such as a light-emitting diode or a display unit. The indicator element is used for example for function display or feedback, error indication, etc.

In addition to the handset 10, an operation of the adjusting drives 7, 8 or of other electrical units connected to the control device 9 can take place via a remote control 20. The remote control 20 also has operating elements and a transmission unit for wireless signals 21. The transmission unit comprises at least one transmitter, but possibly also a receiver for the wireless signals 21. The remote control 20 communicates in the illustrated exemplary embodiment with the handset 10, which for this purpose also has a corresponding communication unit. This includes at least one receiver for the wireless signals 22. If a bidirectional data exchange between the handset 10 and remote control 20 is provided, a further receiver is provided in the transmission unit of the handset 10.

The operation of an operating element of the remote control 20 is transmitted to the handset 10. The received signal is converted there and transmitted—in this case via the cable 11—as a corresponding signal to the control device 9.

In this case, the handset can comprise locking elements, e.g. as a lock switch, optionally as a key switch, via which all or individual functions of the control device 9 can be excluded generally or only by an operation by the remote control 20. In an alternative embodiment, which is shown in FIG. 2 and described in more detail below, the communication unit is not arranged in the (then possibly optional) handset 10, but directly in the control device 9.

It is noted that the transmission between the handset 10 and the remote control 20 may also be bidirectional in order to enable the transmission of signals or information from the control device 9 via the handset 10 to the remote control 20. An actuation of operating elements on the handset 10 can thus also be signaled to the remote control 20.

As a remote control 20, a specially designed (handheld) device can be used. However, it is also possible, in particular, to use a universal mobile device such as a smartphone or a tablet computer, with corresponding software ("app") as a remote control 20.

According to the application, it is provided to evaluate a reception strength of the received wireless signals 21 and to actuate the adjusting drives 7, 8 only if the reception strength exceeds a predetermined threshold value. This will be explained in more detail below in connection with the embodiment of FIG. 2.

FIG. 2 shows another exemplary embodiment of an electromotive furniture drive in the form of a schematic block diagram. This, in turn, has a control device 9, which is set up to actuate the two adjusting drives 7, 8 shown here by way of example.

The control device 9 comprises a power supply 90, which is designed in particular as a switching power supply. In alternative embodiments, the power supply 90 may be arranged externally from the control device 9.

Furthermore, the control device 9 comprises a central control unit 91, comprising switching elements (e.g. transistors or relays) to control the adjusting drives 7, 8. The control unit 91 is configured to receive control signals which relate to the actuation of the adjusting drives 7, 8 and to switch the adjusting drives 7, 8 accordingly.

The control device 9 further comprises a communication unit 92, which in the present case is set up to receive operating commands, inter alia, for the adjusting drives 7, 8 on a wireless communication path. For this purpose, the communication unit 92 has a receiving part which receives wireless signals 21 transmitted by a remote control 20.

In this case, the communication unit 92 may be formed bidirectionally and in turn be able to deliver wireless signals 92', which are received, for example, by the remote control 20. These wireless signals 92' transmitted by the control device 9 to the remote control 20 can be used to transmit certain operating states, e.g. a position of the adjusting drives 7, 8, to the remote control 20 for visualization or for control purposes. However, the wireless signals 92' may also be used in the scope of the transmission protocol, which the remote control 20 and communication unit 92 use, to confirm data reception and/or negotiate addresses and transmission channels. In other words, a bidirectional transmission between the remote control 20 and the communication unit 92 may be implemented even when useful information is sent only from the remote control 20 to the communication unit 92.

As already mentioned, however, also the remote control 20 can alternatively evaluate the wireless signal 92' received from it in terms of the magnitude of signal strength and determine whether an adjusting drive 7, 8 is actuated or a corresponding keystroke of a user of the remote control 20 should be ignored. If it is determined in the remote control 20 that the signal strength of the wireless signal 92' received by it is above a predetermined threshold value, it releases the control signals for controlling the adjusting drive 7, 8 or sends these control signals for moving the adjusting drive 7, 8. The comparison of the signal strength of the received signal with the predetermined threshold value thus takes place by the remote control 20 itself.

The communication unit 92 is adapted to evaluate received wireless signals 21 and to forward them in the form of a control signal 93, which for example may be a serial data stream. Furthermore, a reception strength signal 94 which is associated with the control signal 93 is output by the communication unit 92. The reception strength signal 94 describes a relative or absolute signal strength at which the wireless signal 21 is received by the communication unit 92.

The two signals 93, 94 can be output as separate signals and are further processed by a discriminator 95 in the illustrated embodiment. In alternative embodiments, the reception strength signal 94 and the control signal 93 may be output as a common signal, for example by co-transmitting a reception strength encoded in a data stream of the control signal 93.

The discriminator 95 comprises a threshold value for a minimum reception strength and is adapted to forward the control signal 93 to the control unit 91 only if the associated reception strength signal 94 is above the predetermined threshold value. According to the application, it is achieved in this way that motion commands contained in a coded manner in the control signal 93 for components controlled via the remote control 20, in particular the adjusting drives 7, 8, are only implemented when the wireless signal 21 is received with a certain minimum reception strength. It is understood that the discriminator 95 may also be integrated in the control unit 91.

The reception strength depends, among other factors, in particular on the distance between the remote control 20 and the communication unit 92 and on the transmission path between the two components. By monitoring an at least available reception signal strength, it can be prevented that a wireless signal 21, which is emitted by the remote control 20, while it is, for example, in an adjacent room, leads to a movement of the adjusting drives 7, 8. In this way, an uncontrolled actuation of the adjusting drives 7, 8 is prevented.

A mobile phone, in particular a so-called smartphone, can be used as a remote control 20, especially when the transmission of the wireless signals 21 is carried out according to a Bluetooth or WLAN protocol or according to another short-range radio transmission technology. Other than in a remote control specially provided for the electromotive furniture drive, there is a higher danger in such a universally usable device that it may be taken into adjacent rooms and used there, e.g. by unintentional actuation, to control the electromotive furniture drive. The comparison with the threshold value according to the application can prevent this.

In one embodiment, the predetermined threshold value can be fixedly predetermined and can be oriented with respect to its magnitude to typical reception strengths, which are achieved at a distance of a few meters by standard equipment. In alternative embodiments it may be provided that the threshold values can be adjusted. This can be done via a selection of different, in turn predetermined threshold levels.

In a further embodiment, it is conceivable that the level of the threshold value is adjusted based on the magnitude of received signal strengths of the wireless signal 21. For this purpose, it can be provided, for example, to walk through a room area, in which the remote control 20 is to be useable, during the emission of a test signal. During this learning phase, the received reception strength 94 is logged and subsequently the threshold value is set depending on a minimum reception strength received. Such a method can be carried out analogously when the comparison with the threshold value is performed in the remote control and not in the control device.

In the exemplary embodiment of FIG. 2, the communication unit 92 is integrated directly in the control device 9. However, it is also conceivable that the communication unit 92 is arranged externally of the control device 9, for example in a separate housing or, as shown in the exemplary embodiment of FIG. 1, integrated into a separate handset 10, which is coupled to the control device 9 via a cable 11.

What is claimed is:

1. An electromotive furniture drive, comprising:
   an adjusting drive for electromotive movement of a movable furniture component relative to another furniture component;
   a remote control;
   a communication unit configured to receive a wireless signal from the remote control and to determine a signal strength of the wireless signal; and
   a control device configured to control operation of the adjusting drive in response to the wireless signal only when the signal strength of the wireless signal exceeds a predetermined threshold value,
   wherein the communication unit outputs a common signal comprising a control signal reflective of a content of the wireless signal and a reception strength signal reflective of the signal strength of the wireless signal by co-transmitting the reception signal strength encoded in a data stream of the control signal.

2. The electromotive furniture drive of claim 1, wherein the control device comprises a discriminator which is connected to the communication unit and configured to forward the control signal only when the reception strength signal exceeds the predetermined threshold.

3. The electromotive furniture drive of claim 2, wherein at least one of the communication unit and the discriminator are integrated in the control device.

4. The electromotive furniture drive of claim 1, further comprising a handset and a cable connecting the handset with the control device so that the adjusting drive is controllable by the control device via the handset.

5. The electromotive furniture drive of claim 4, wherein the control device comprises a discriminator which is connected to the communication unit and configured to forward the control signal only when the reception strength signal exceeds the predetermined threshold, at least one of the communication unit and the discriminator being integrated in the handset.

6. The electromotive furniture drive of claim 4, wherein the handset comprises a manually operable lock switch switchable to a position "lock", in which the lock switch locks transmission of a control command to the control device for operation of the adjusting drive.

7. The electromotive furniture drive of claim 6, wherein transmission of the control command is lockable only when received via the remote control.

8. The electromotive furniture drive of claim 1, wherein the remote control is designed as a smartphone.

9. The electromotive furniture drive of claim 1, wherein the remote control transmits the wireless signal according to a Bluetooth, WLAN, DECT or ZigBee protocol.

10. A furniture, comprising:
    a movable first furniture part;
    a second furniture part; and
    an electromotive furniture drive including an adjusting drive for electromotive movement of a movable furniture component relative to a further furniture component, a remote control, a communication unit configured to receive a wireless signal from the remote control and to determine a signal strength of the wireless signal, and a control device configured to control operation of the adjusting drive in response to the wireless signal only when the signal strength of the wireless signal exceeds a predetermined threshold value,
    wherein the communication unit outputs a common signal comprising a control signal reflective of a content of the wireless signal and a reception strength signal reflective of the signal strength of the wireless signal by co-transmitting the reception signal strength encoded in a data stream of the control signal.

11. The furniture of claim 10, wherein the control device comprises a discriminator which is connected to the communication unit and configured to forward the control signal only when the reception strength signal exceeds the predetermined threshold.

12. The furniture of claim 11, wherein at least one of the communication unit and the discriminator are integrated in the control device.

13. The furniture of claim 10, wherein the electromotive furniture drive includes a handset and a cable connecting the handset with the control device so that the adjusting drive is controllable by the control device via the handset.

14. The furniture of claim 13, wherein the control device comprises a discriminator which is connected to the communication unit and configured to forward the control signal only when the reception strength signal exceeds the predetermined threshold, at least one of the communication unit and the discriminator being integrated in the handset.

15. The furniture of claim 13, wherein the handset comprises a manually operable lock switch switchable to a position "lock", in which the lock switch locks transmission of a control command to the control device for operation of the adjusting drive.

16. The furniture of claim 15, wherein transmission of the control command is lockable only when received via the remote control.

17. The furniture of claim 10, wherein the remote control is designed as a smartphone.

18. The furniture of claim 10, wherein the remote control transmits the wireless signal according to a Bluetooth, WLAN, DECT or ZigBee protocol.

19. A method for controlling an electromotive furniture drive, comprising:
  sending a wireless signal from a remote control to a communication unit;
  receiving the wireless signal by the communication unit;
  determining a control signal reflective of the received wireless signal;
  determining a signal strength of the received wireless signal;
  comparing the signal strength with a predetermined threshold value;
  controlling operation of an adjusting drive for electromotive movement of a movable furniture component relative to another furniture component in response to the control signal when the signal strength exceeds the predetermined threshold value; and
  ignoring the control signal when the signal strength does not exceed the predetermined threshold value,
  wherein the communication unit outputs a common signal comprising the control signal and the received wireless signal by co-transmitting the received wireless signal encoded in a data stream of the control signal.

20. The method of claim 19, further comprising determining the threshold value from a magnitude of the signal strength of the wireless signal previously received during a learning phase.

21. A method for controlling an electromotive furniture drive, comprising:
  sending a wireless signal from a communication unit to a remote control;
  receiving the wireless signal by the remote control;
  determining a signal strength of the received wireless signal;
  comparing the signal strength with a predetermined threshold value; and
  controlling operation of an adjusting drive for electromotive movement of a movable furniture component relative to another furniture component only when the signal strength exceeds the predetermined threshold value,
  wherein the communication unit outputs a common signal comprising a control signal reflective of a content of the wireless signal and the received wireless signal by co-transmitting the received wireless signal encoded in a data stream of the control signal.

22. The method of claim 21, further comprising determining the threshold value from a magnitude of the signal strength of the wireless signal previously received during a learning phase.

* * * * *